(12) United States Patent
Jo et al.

(10) Patent No.: US 12,688,636 B2
(45) Date of Patent: Jul. 21, 2026

(54) METHOD OF GENERATING IMAGE DATA FOR DANGEROUS OBJECT DETECTION AND IMAGING SYSTEM USING THE SAME

(71) Applicant: ELECTRONICS AND TELECOMMUNICATIONS RESEARCH INSTITUTE, Daejeon (KR)

(72) Inventors: Sungwoo Jo, Daejeon (KR); Kyung Hyun Park, Daejeon (KR); Il Min Lee, Daejeon (KR); Mugeon Kim, Daejeon (KR); Jungsoo Kim, Daejeon (KR); Eui Su Lee, Daejeon (KR); Da Hye Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 399 days.

(21) Appl. No.: 18/473,843

(22) Filed: Sep. 25, 2023

(65) Prior Publication Data

US 2024/0104801 A1     Mar. 28, 2024

(30) Foreign Application Priority Data

Sep. 26, 2022     (KR) ........................ 10-2022-0121728
Sep. 18, 2023     (KR) ........................ 10-2023-0124071

(51) Int. Cl.
 G06T 12/20          (2026.01)
 G01V 8/10           (2006.01)
(52) U.S. Cl.
 CPC ................ G06T 12/20 (2026.01); G01V 8/10 (2013.01); G06T 2200/04 (2013.01); G06T 2211/421 (2013.01); G06T 2211/441 (2023.08)

(58) Field of Classification Search
 CPC .............. G06T 11/006; G06T 2200/04; G06T 2211/421; G06T 2211/441; G06T 5/50;
(Continued)

(56) References Cited

U.S. PATENT DOCUMENTS 8,977,062 B2     3/2015  Gonzalez et al.
10,390,756 B2     8/2019  Youm et al.
(Continued)

FOREIGN PATENT DOCUMENTS

CN           111257957 A  *  6/2020  ............. G06V 20/52
KR     10-2019-0014908 A     2/2019
(Continued)

OTHER PUBLICATIONS

Fernandes, J. L., Tedeschi, J. R., Sheen, D. M., & McMakin, D. L. (May 2013). Three-dimensional millimeter-wave imaging for concealed threat detection in shoes. In Passive and Active Millimeter-Wave Imaging XVI (vol. 8715, pp. 90-97). SPIE. (Year: 2013).*
(Continued)

*Primary Examiner* — Jennifer Mehmood
*Assistant Examiner* — Vaisali Rao Koppolu

(57)          ABSTRACT

Disclosed is an image data generating method. Operations of emitting electromagnetic waves to an object and receiving scan signals scanning the object are performed by using a multi-static transceiver. First image data of a low resolution are generated based on the scan signals. when a first condition associated with the first image data is satisfied, second image data of a high resolution associated with a sub-region of the first image data are generated. When a second condition associated with the second image is satisfied, third image data based on the first image data and the second image data are generated.

18 Claims, 14 Drawing Sheets

(58) Field of Classification Search
CPC ... G06T 5/70; G06T 2207/20056; G01V 8/10;
G01V 3/17; G01V 3/12; G01S 13/89;
G01S 17/89
See application file for complete search history.

(56) References Cited

U.S. PATENT DOCUMENTS

| | | | |
|---|---|---|---|
| 10,599,930 | B2 | 3/2020 | Lee et al. |
| 11,064,906 | B2 | 7/2021 | Shin et al. |
| 11,506,776 | B2 | 11/2022 | Cho et al. |
| 2008/0116374 | A1 | 5/2008 | Ouchi et al. |
| 2014/0185755 | A1 | 7/2014 | Bendahan |
| 2017/0270475 | A1 | 9/2017 | Cohen et al. |
| 2019/0244399 | A1* | 8/2019 | Li ..................... G01R 33/56509 |
| 2021/0325560 | A1* | 10/2021 | Jones ..................... G01S 13/887 |
| 2023/0237803 | A1* | 7/2023 | Khan ........................ G06T 7/10 |
| | | | 382/103 |

FOREIGN PATENT DOCUMENTS

| | | | |
|---|---|---|---|
| KR | 10-2020-0071021 | A | 6/2020 |
| KR | 10-2020-0144862 | A | 12/2020 |

OTHER PUBLICATIONS

Zhang, J., Xing, W., Xing, M., & Sun, G. (2018). Terahertz image detection with the improved faster region-based convolutional neural network. Sensors, 18(7), 2327. (Year: 2018).*
Yuan, J., & Guo, C. (Jun. 2018). A deep learning method for detection of dangerous equipment. In 2018 Eighth International Conference on Information Science and Technology (ICIST) (pp. 159-164). IEEE. (Year: 2018).*

* cited by examiner

FIG. 1

| | # of signal sources and detectors | Expense | Speed |
|---|---|---|---|
| Mono-static manner | Many | High Price | Low Speed |
| Multi-static manner | Few | Low Price | High Speed |

FIG. 12

| | Technique for IMGDAT1 Generation | Technique for IMGDAT2 Generation |
|---|---|---|
| First Manner | Fast Fourier transform | High-resolution Back-projection |
| Second Manner | Low-resolution Back-projection | High-resolution Back-projection |
| ⋮ | ⋮ | ⋮ |

FIG. 13

METHOD OF GENERATING IMAGE DATA FOR DANGEROUS OBJECT DETECTION AND IMAGING SYSTEM USING THE SAME

CROSS-REFERENCE TO RELATED APPLICATIONS

This application claims priority under 35 U.S.C. § 119 to Korean Patent Application Nos. 10-2022-0121728 filed on Sep. 26, 2022, and 10-2023-0124071, filed on Sep. 18, 2023, respectively, in the Korean Intellectual Property Office, the disclosures of which are incorporated by reference herein in their entireties.

BACKGROUND

Embodiments of the present disclosure described herein relate to a security system, and more particularly, relate to an image data generating method for detecting an object and an imaging system using the same.

Nowadays, a security system is being used in various places. The security system may be mainly used to prevent crimes or accidents in important public facilities, corporate facilities, government agencies, etc. A large number of people go in and out of a place where the security system is installed, or a large number of items are carried in/out in the place. The security systems should have sufficient performance to efficiently search for and detect dangerous objects hidden in the people or items.

A modern security system uses a three-dimensional (3D) imaging system to improve the precision. However, the above way to search for and detect dangerous objects with respect to multiple people or multiple items by using the 3D imaging system requires a large amount of computing resources along with controversy over the harmfulness to the human body, thereby causing the reduction of performance of the security system.

SUMMARY

Embodiments of the present disclosure provide an image data generating method for detecting a dangerous object with high precision without harmfulness to the human body. Embodiments of the present disclosure provide an imaging system using the image data generating method.

According to an embodiment, in an image data generating method, operations of emitting electromagnetic waves to an object and receiving scan signals scanning the object are performed by using a multi-static transceiver. First image data of a low resolution are generated based on the scan signals. when a first condition associated with the first image data is satisfied, second image data of a high resolution associated with a sub-region of the first image data are generated. When a second condition associated with the second image is satisfied, third image data based on the first image data and the second image data are generated.

According to an embodiment, an imaging system includes an electromagnetic wave transceiver and an image data generating device. The electromagnetic wave transceiver emits electromagnetic waves to an object and receives scan signals scanning the object. The image data generating device generates synthetic image data based on the scan signals. The image data generating device generates first image data of a low resolution based on the scan signals, generates second image data of a high resolution associated with a sub-region of the first image data when a first condition associated with the first image data is satisfied, and generates third image data as the synthetic image data based on the first image data and the second image data when a second condition associated with the second image data is satisfied.

BRIEF DESCRIPTION OF THE FIGURES

The above and other objects and features of the present disclosure will become apparent by describing in detail embodiments thereof with reference to the accompanying drawings.

FIG. 1 is a block diagram illustrating an imaging system according to an embodiment of the present disclosure.

FIG. 12 is a diagram for describing techniques for generating first image data and second image data of FIG. 1.

FIG. 13 is a diagram for describing an embodiment of first image data, second image data, and third image data of FIG. 1.

DETAILED DESCRIPTION

Figures 2, 3:
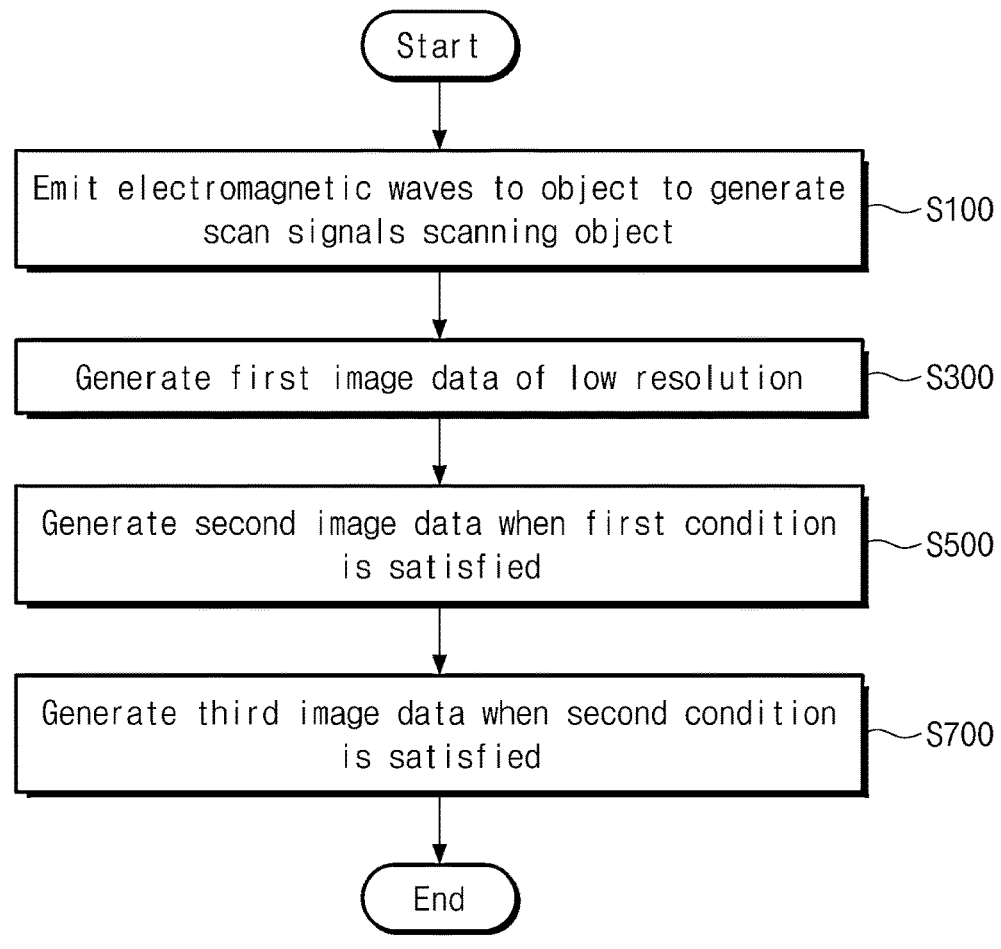
FIG. 2 is a diagram for describing how to implement an electromagnetic wave transceiver of FIG. 1.
FIG. 3 is a flowchart illustrating an image data generating method according to an embodiment of the present disclosure.

Below, embodiments of the present disclosure will be described in detail and clearly to such an extent that one skilled in the art easily carries out the present disclosure.

Figure 1:
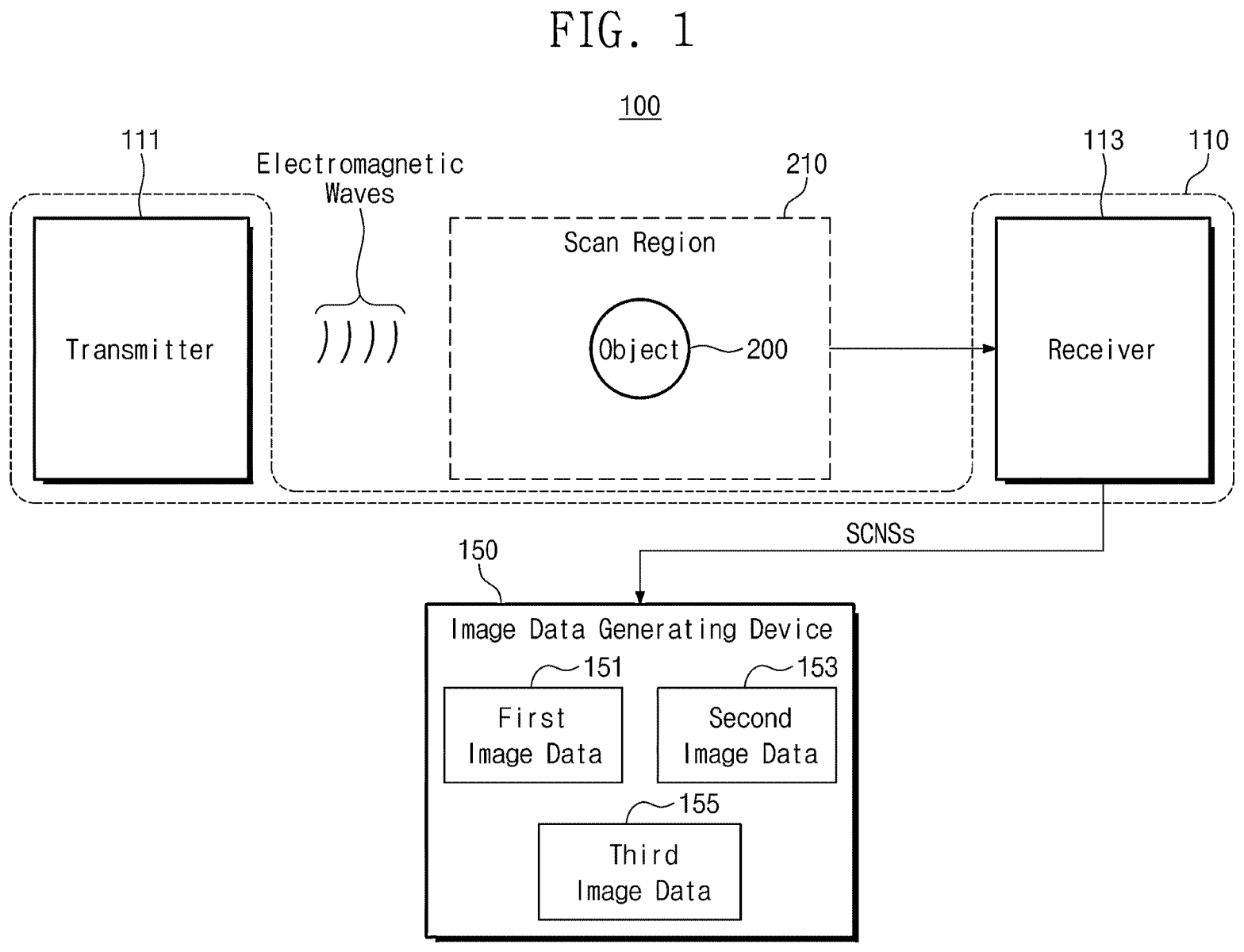

FIG. 1 is a block diagram illustrating an imaging system according to an embodiment of the present disclosure.

Referring to FIG. 1, an image system 100 may include an electromagnetic wave transceiver 110 including a transmitter 111 and a receiver 113, and an image data generating device 150. In an embodiment, the image system 100 may be included in a security system installed in a place where a large number of people go in and out or a large number of items are carried in/out.

The transmitter 111 may emit an electromagnetic wave to an object 200, and the receiver 113 may generate scan signals SCNSs scanning the object 200.

In an embodiment, the electromagnetic wave may be a terahertz wave whose frequency band ranges from about 0.1 THz to about 10 THz. Because the frequency band of the terahertz wave is between frequency bands of a light wave and a microwave and the terahertz wave has an intermediate property between the light wave and the microwave, the terahertz wave may have permeability to non-polar materials such as ceramic, plastic, and paper, may have a non-destructive property, and may be harmless to the human body unlike X-rays.

In an embodiment, the transmitter 111 may include a plurality of signal sources, and the receiver 113 may include a plurality of detectors. For example, the transmitter 111 may generate the electromagnetic waves by using the plurality of signal sources, and the receiver 113 may detect the scan signals SCNSs by using the plurality of detectors.

In an embodiment, the electromagnetic wave transceiver 110 may be implemented in a mono-static manner where the transmitter 111 and the receiver 113 are disposed at the same location or at neighboring locations, but the present disclosure is not limited thereto. In another embodiment, the electromagnetic wave transceiver 110 may be implemented in a "multi-static manner" in which the transmitter 111 and the receiver 113 are disposed at different locations. In this case, the electromagnetic wave transceiver 110 may be referred to as a "multi-static transceiver 110". The imaging system 100 including the electromagnetic wave transceiver 110 implemented in a multi-static manner may be more effective in configurations and operations of the present disclosure to be described with reference to FIGS. 2 to 13.

In an embodiment, the transmitter 111 may emit the electromagnetic waves to a scan region 210; when the object 200 is present in the scan region 210, the receiver 113 may receive electromagnetic waves passing through the object 200 (or reflected from the object 200) and may generate the scan signals SCNSs. The scan signals SCNSs generated by the receiver 113 may be output to the image data generating device 150.

The image data generating device 150 may generate synthetic (or composite) image data based on the scan signals SCNSs.

In an embodiment, the image data generating device 150 may generate one or more image data based on the scan signals SCNSs. For example, the image data generating device 150 may generate one image data based on the scan signals SCNS s; when one or more given conditions are satisfied with regard to the generated image data, the image data generating device 150 may additionally generate one or more different image data. For example, the one or more given conditions may include a condition that existence of a suspicious object (or a boundary of the suspicious object), a preset object candidate (or a boundary of the object candidate), or a preset target object (or a boundary of the target object) is detected from specific image data, and the number of image data to be additionally generated when the one or more given conditions are satisfied may be variable.

In an embodiment, the image data generating device 150 may generate first image data 151 of the low resolution based on the scan signals SCNSs; when a first condition associated with the first image data 151, the image data generating device 150 may generate second image data 153 of the high resolution associated with a sub-region of the first image data 151; when a second condition associated with the second image data 153, the image data generating device 150 may generate third image data 155 as the synthetic image data based on the first image data 151 and the second image data 153. The first image data 151, the second image data 153, and the third image data 155 will be described with reference to FIGS. 4 to 6, 11, and 12.

In an embodiment, the image data generating device 150 may detect the existence of the suspicious object (or a boundary of the suspicious object), the target object candidate (or a boundary of the target object candidate), or the final target object (or a boundary of the final target object) by using one or more deep learning models. The one or more deep learning models may include a convolutional neural network (CNN), a region-CNN (R-CNN), a fast RCNN, a faster RCNN, a region-based fully convolutional network (RFCN), a mask RCNN, a YOLO (you only look once), a single shot detector (SSD), PointNet, and PointNet++, but the present disclosure is not limited thereto. The one or more deep learning models will be described with reference to FIG. 3.

In an embodiment, the image data generating device 150 may generate the first image data 151 and the second image data 153 by using different techniques; in this case, the resolution of the first image data 151 may be different from the resolution of the second image data 153. For example, the resolution of the first image data 151 may be lower than the resolution of the second image data 153. The techniques for generating the first image data 151 and the second image data 153 will be described with reference to FIG. 12.

In an embodiment, each of the first image data 151, the second image data 153, and the third image data 155 may be three-dimensional (3D) image data.

Through the above configuration, an imaging system according to embodiments of the present disclosure may efficiently search for and detect a hidden dangerous object by using electromagnetic waves. The imaging system may generate image data with a low resolution and may additionally generate image data with a high resolution only when a given condition is satisfied, and thus, the imaging system may search for and detect a dangerous object at high speed and with high precision. The imaging system may be implemented in a multi-static manner and may provide performance of an equivalent level by using a small number of signal sources and a small number of detectors, compared to a mono-static manner where a transmitter and a receiver are disposed at the same location or at neighboring locations. The imaging system may search for and detect a dangerous object in real time without harmfulness to the human body by using terahertz waves, and thus, the imaging system may be used in a security system of a walk-through manner.

FIG. 2 is a diagram for describing an electromagnetic wave transceiver of FIG. 1.

Referring to FIG. 1, the electromagnetic wave transceiver 110 may include the transmitter 111 and the receiver 113 and may be implemented in the "mono-static manner" where the transmitter 111 and the receiver 113 are disposed at the same location or at neighboring locations or in the "multi-static manner" wherein the transmitter 111 and the receiver 113 are disposed at different locations.

In an embodiment, the multi-static manner may mean that the transmitter 111 and the receiver 113 are disposed to face each other in a state of being spaced from each other.

Referring to FIGS. 1 and 2, comparing the mono-static manner and the multi-static manner, the multi-static manner may be cheaply implemented by using a small number of signal sources and a small number of detectors compared to the mono-static manner and may support a higher speed than the mono-static manner.

An imaging system according to embodiments of the present disclosure may be used to search for and detect a dangerous object in real time in a walk-through security system and may be implemented in the multi-static manner. This may make it possible to provide more marked effects.

FIG. 3 is a flowchart illustrating an image data generating method according to an embodiment of the present disclosure.

Referring to FIGS. 1 and 2, the scan signals SCNSs scanning the object 200 may be generated by emitting the terahertz wave to the object 200 by using the electromagnetic wave transceiver 110 (S100).

The first image data 151 may be generated based on the first image data 151 of the low resolution (S300).

When the first condition associated with the first image data 151 is satisfied, the second image data 153 of the high resolution associated with a sub-region of the first image data 151 may be generated (S500).

When the second condition associated with the second image data 153 is satisfied, the third image data 155 may be generated based on the first image data 151 and the second image data 153 (S700).

In an embodiment, operation S100 may be performed by the electromagnetic wave transceiver (e.g., 110 of FIG. 1), and operation S300, operation S500, and operation S700 may be performed by an image data generating device (e.g., 150 of FIG. 1).

Figure 4:
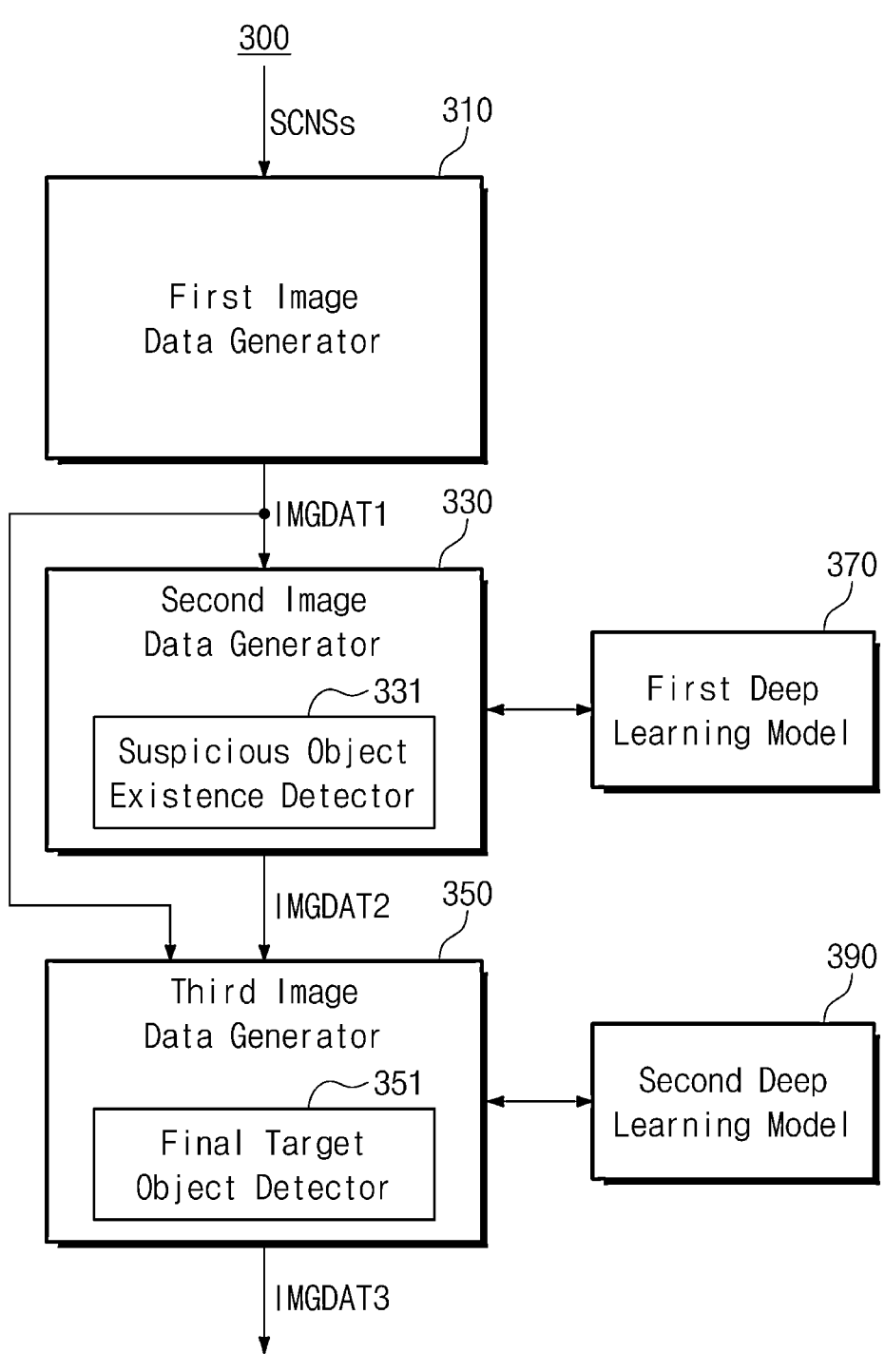
FIG. 4 is a block diagram illustrating an embodiment of an image data generating device of FIG. 1.

FIG. 4 is a block diagram illustrating an embodiment of an image data generating device of FIG. 1.

Referring to FIG. 4, an image data generating device 300 may correspond to the image data generating device 150 of FIG. 1.

The image data generating device 300 may include a first image data generator 310, a second image data generator 330, and a third image data generator 350. The second image data generator 330 may include a suspicious object existence detector 331, and the third image data generator 350 may include a final target object detector 351. The image data generating device 300 may further include a first deep learning model 370 and a second deep learning model 390.

The first image data generator 310 may receive the scan signals SCNSs from a receiver (e.g., 113 of FIG. 1) and may generate first image data IMGDAT1 based on the scan signals SCNSs.

The second image data generator 330 may receive the first image data IMGDAT1 from the first image data generator 310 and may generate second image data IMGDAT2 based on the first image data IMGDAT1.

The third image data generator 350 may receive the second image data IMGDAT2 from the second image data generator 330 and may generate third image data IMGDAT3 based on the second image data IMGDAT2.

In an embodiment, the first image data IMGDAT1 may be generated by using a first image data generation technique, and the second image data IMGDAT2 may be generated by using a second image data generation technique. For example, the first image data generator 310 may generate the first image data IMGDAT1 by applying the first image data generation technique to the scan signals SCNSs, and the second image data generator 330 may generate the second image data IMGDAT2 by applying the second image data generation technique to the sub-region of the first image data IMGDAT1.

In an embodiment, the first image data generation technique may refer to a technique for generating image data at high speed and with a low resolution, and the second image data generation technique may refer to a technique for generating image data at low speed and with a high resolution.

In an embodiment, the suspicious object existence detector 331 may detect the existence of the suspicious object (or a boundary of the suspicious object) from the first image data IMGDAT1, and the final target object detector 351 may detect the final target object (or a boundary of the final target object) from the second image data IMGDAT2. For example, the suspicious object existence detector 331 may detect the existence of the suspicious object (or the boundary of the suspicious object) from the first image data IMGDAT1 by using the first deep learning model 370, and the final target object detector 351 may detect the final target object (or the boundary of the final target object) from the second image data IMGDAT2 by using the second deep learning model 390.

In an embodiment, the second image data IMGDAT2 may be generated when the existence of the suspicious object (or the boundary of the suspicious object) is detected from the first image data IMGDAT1; depending on whether the final target object (or the boundary of the final target object) is detected from the second image data IMGDAT2, the third image data IMGDAT3 may be generated based on both the first image data IMGDAT1 and the second image data IMGDAT2 or may be generated only based on the first image data IMGDAT1.

In an embodiment, a target for detection by an imaging system (e.g., 100 of FIG. 1) according to embodiments of the present disclosure may be dangerous objects, but the suspicious object may be detected regardless of the dangerous objects. For example, when it is determined that there is an arbitrary object that is not identified in detail in the first image data IMGDAT1, the suspicious object existence detector 331 may detect the arbitrary object as the suspicious object. The final target object may be one of dangerous objects targeted for final detection by the imaging system according to embodiments of the present disclosure.

In an embodiment, the first deep learning model 370 may be trained to detect the suspicious object from the first image data IMGDAT1; the second deep learning model 390 may be trained to detect the final target object from the second image data IMGDAT2. In this case, the first deep learning model 370 may be trained such that a plurality of people or a plurality of items that are not the dangerous objects are not detected as the suspicious object. For example, when a specific person wears clothes, boots, or shoes and dangerous objects are hidden in the worn items, the first deep learning model 370 may be trained such that the worn items themselves that are not the dangerous objects are not detected as the suspicious objects.

Figure 5:
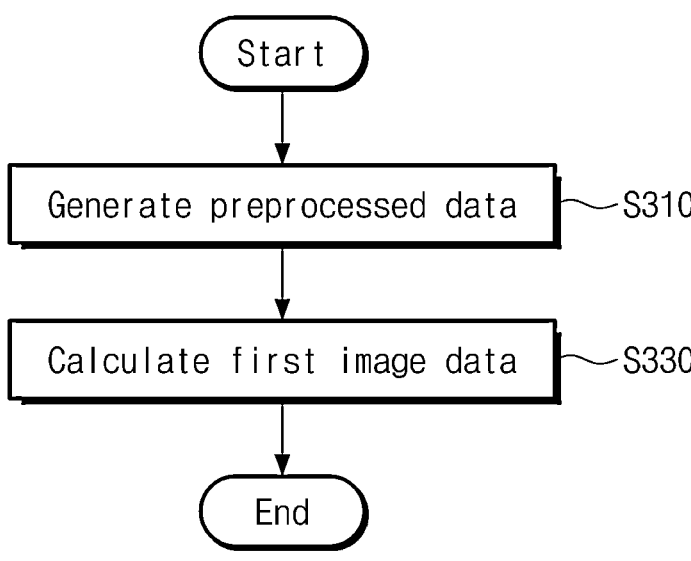
FIG. 5 is a flowchart illustrating an embodiment of an operation of generating first image data of FIG. 2.

FIG. 5 is a flowchart illustrating an embodiment of an operation of generating first image data of FIG. 2.

Referring to FIG. 5, in operation S300 (refer to FIG. 3) in which first image data (e.g., 151 of FIG. 1 and IMGDAT1 of FIG. 4) are generated, preprocessed data may be generated (S310).

In an embodiment, the preprocessed data may be generated by performing noise cancellation, error correction, or data alignment with respect to the scan signals SCNSs (refer to FIGS. 1 and 3).

The first image data may be calculated by processing the preprocessed data (S300).

In an embodiment, the processing of the preprocessed data may be performed by using the first image data generation technique described with reference to FIG. 4.

In an embodiment, operation S310 and operation S330 may be performed an image data generating device (e.g., 150 of FIG. 1) or a first image data generator (e.g., 310 of FIG. 4).

Figure 6:
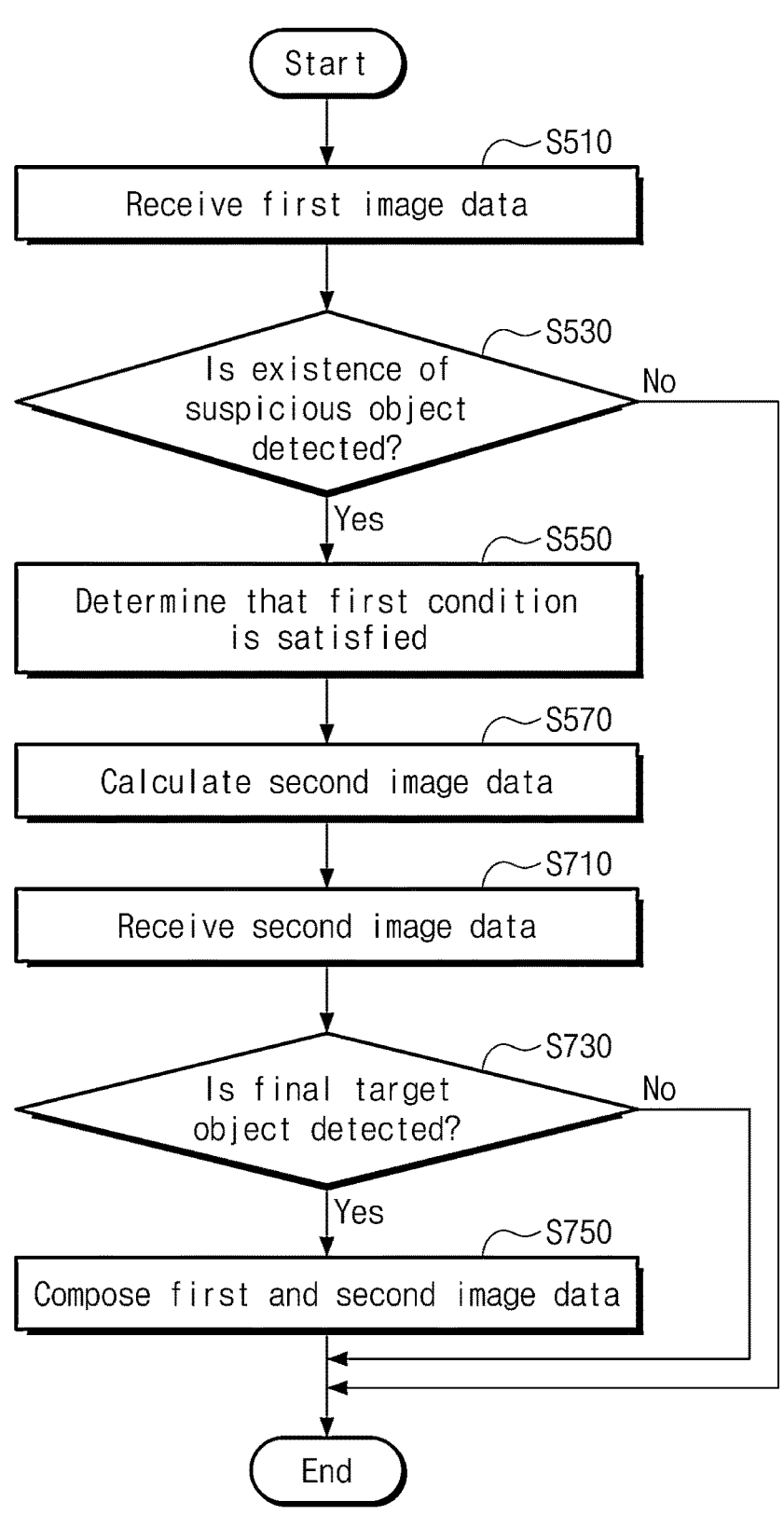
FIG. 6 is a flowchart illustrating an embodiment of operations of generating second image data and third image data of FIG. 2.

FIG. 6 is a flowchart illustrating an embodiment of operations of generating second image data and third image data of FIG. 2.

Referring to FIG. 6, in operation S500 (refer to FIG. 3) in which second image data (e.g., 153 of FIG. 2 and IMGDAT2 of FIG. 4) are generated, first image data (e.g., 151 of FIG. 1 and IMGDAT1 of FIG. 3) may be received (S510).

Whether the existence of a suspicious object is detected from the first image data may be determined (S530).

When the existence of the suspicious object (or a boundary of the suspicious object) is detected from the first image data (Yes in operation S530), it may be determined that the first condition is satisfied (S550), and the second image data may be calculated only with respect to a sub-region of the first image data (S570).

In operation S700 (refer to FIG. 2) in which third image data (e.g., 155 of FIG. 1 and IMGDAT3 of FIG. 4) are generated, the second image data may be received (S710).

Whether the final target object is detected from the second image data may be determined (S730).

When the final target object (or a boundary of the final target object) is detected from the second image data (Yes in operation S730), the first image data and the second image data may be composed as the third image data (S750).

In an embodiment, when the existence of the suspicious object is not detected from the first image data (No in operation S530), the second image data may not be generated, and operation S500 and operation S700 of FIG. 2 may end. In this case, the first image data may be output as the third image data without modification.

In an embodiment, when the final target object is not detected from the second image data (No in operation S730), the first image data and the second image data may not be composed, and operation S500 and operation S700 of FIG. 2 may end. In this case, the first image data may be output as the third image data without modification.

In an embodiment, operation S510, operation S530, operation S550, operation S570, operation S710, operation S730, and operation S750 may be performed by an image data generating device (e.g., 150 of FIG. 1), operation S510, operation S530, and operation S550 may be performed by a second image data generator (e.g., 330 of FIG. 3), and operation S710, operation S730, and operation S750 may be performed by a third image data generator (e.g., 350 of FIG. 3).

Figure 7:
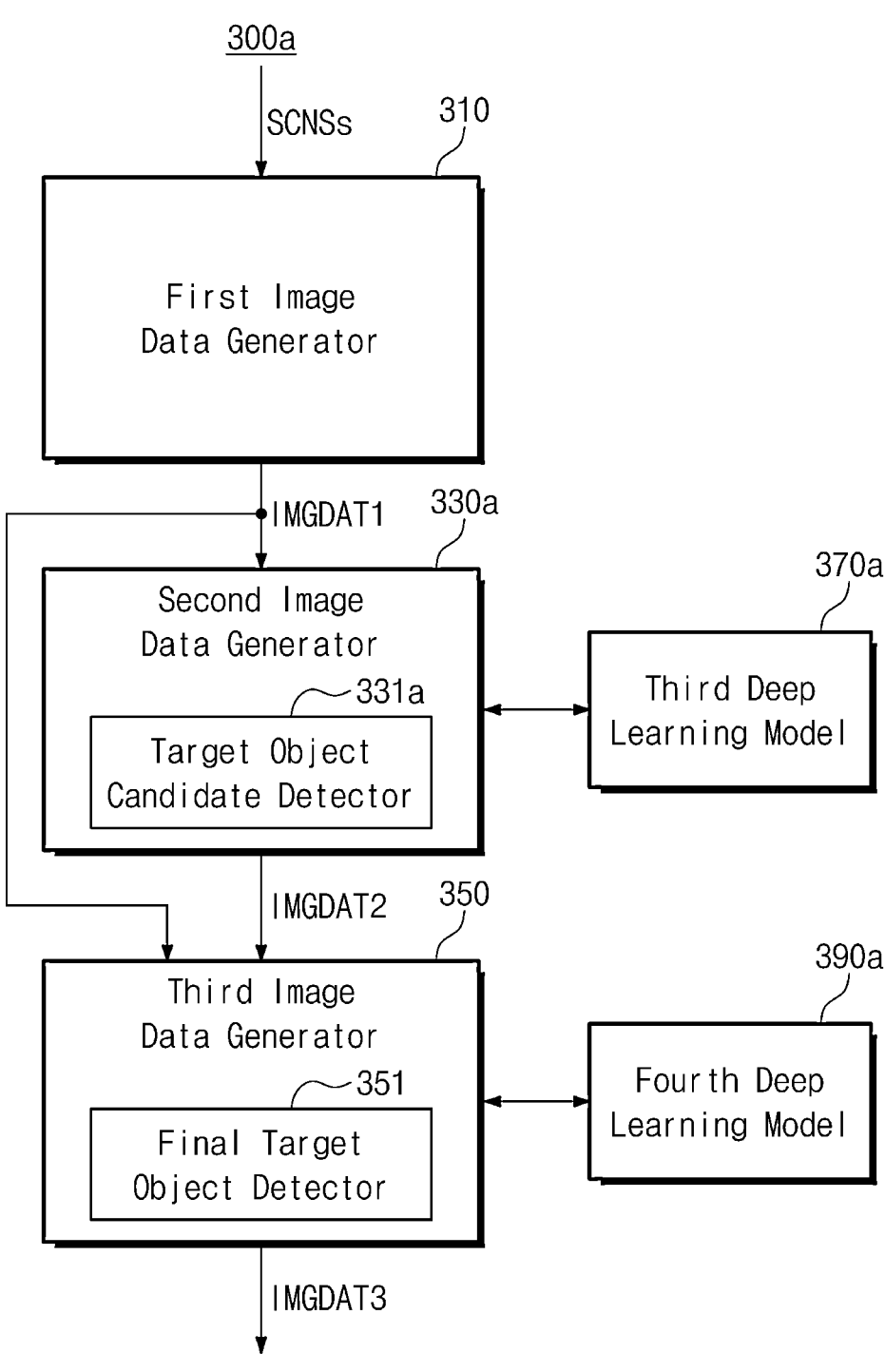
FIG. 7 is a block diagram illustrating another embodiment of an image data generating device of FIG. 1.

FIG. 7 is a block diagram illustrating another embodiment of an image data generating device of FIG. 1.

Referring to FIG. 7, an image data generating device 300a may correspond to the image data generating device 150 of FIG. 1.

The image data generating device 300a may include a first image data generator 310, a second image data generator 330a, and a third image data generator 350. The second image data generator 330a may include a target object candidate detector 331a, and the third image data generator 350 may include the final target object detector 351. The image data generating device 300a may further include a third deep learning model 370a and a fourth deep learning model 390a. Compared to the image data generating device 300 of FIG. 4, the image data generating device 300a may include the target object candidate detector 331a instead of the suspicious object existence detector 331 and may include the third deep learning model 370a and the fourth deep learning model 390a instead of the first deep learning model 370 and the second deep learning model 390.

In an embodiment, the target object candidate detector 331a may detect a target object candidate from the first image data IMGDAT1, and the final target object detector 351 may detect a final target object from the second image data IMGDAT2. For example, the target object candidate detector 331a may detect the target object candidate from the first image data IMGDAT1 by using the third deep learning model 370a, and the final target object detector 351 may detect the final target object from the second image data IMGDAT2 by using the fourth deep learning model 390a.

In an embodiment, the second image data IMGDAT2 may be generated when the target object candidate is detected from the first image data IMGDAT1; depending on whether the final target object is detected from the second image data IMGDAT2, the third image data IMGDAT3 may be generated based on both the first image data IMGDAT1 and the second image IMGDAT2 or may be generated only based on the first image data IMGDAT1.

In an embodiment, dangerous objects targeted for detection by an imaging system (e.g., 100 of FIG. 1) according to embodiments of the present disclosure may be classified to be included in two or more categories of a hierarchical structure. The target object candidate may be one of detailed items included in an upper category among the two or more categories, and the final target object may be one of detailed items included in a lower category among the two or more categories.

In an embodiment, the third deep learning model 370a may be trained to detect, as the target object candidate, one of the detailed items included in the upper category from the first image data IMGDAT1; the fourth deep learning model 390a may be trained to detect, as the final target object, one of the detailed items included in the lower category from the second image data IMGDAT2.

Figure 8:
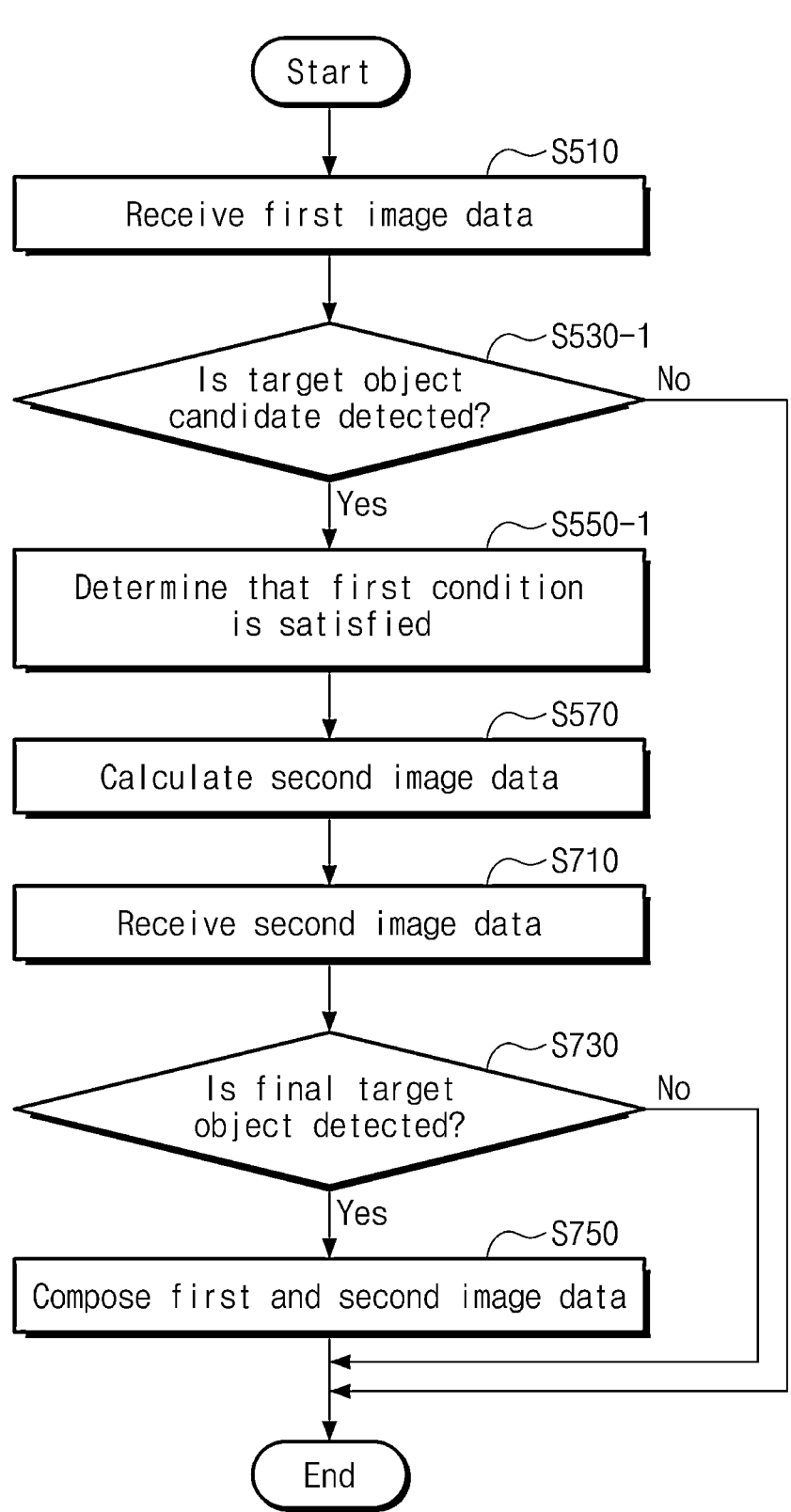
FIG. 8 is a flowchart illustrating another embodiment of operations of generating second image data and third image data of FIG. 2.

FIG. 8 is a flowchart illustrating another embodiment of operations of generating second image data and third image data of FIG. 2.

Referring to FIG. 8, in operation S500 (refer to FIG. 3) in which second image data (e.g., 153 of FIG. 1 and IMGDAT2 of FIG. 7) are generated, first image data (e.g., 151 of FIG. 1 and IMGDAT1 of FIG. 7) may be received (S510).

Whether a target object candidate is detected from the first image data may be determined (S530-1).

When the target object candidate (or a boundary of the target object candidate) is detected from the first image data (Yes in operation S530-1), it may be determined that the first condition is satisfied (S550-1), and the second data may be calculated only with respect to a sub-region of the first image data (S570).

In operation S700 (refer to FIG. 3) in which third image data (e.g., 155 of FIG. 1 and IMGDAT3 of FIG. 7) are generated, the second image data may be received (S710).

Whether a final target object is detected from the second image data may be determined (S730).

When the final target object (or a boundary of the final target object) is detected from the second image data (Yes in operation S740), the first image data and the second image data may be composed as the third image data (S750).

In an embodiment, when the target object candidate (or the boundary of the target object candidate) is not detected from the first image data (No in operation S530-1), the second image data may not be generated, and operation S500 and operation S700 of FIG. 3 may end. In this case, the first image data may be output as the third image data without modification.

In an embodiment, when the final target object is not detected from the second image data (No in operation S730), the first image data and the second image data may not be composed, and operation S500 and operation S700 of FIG.

3 may end. In this case, the first image data may be output as the third image data without modification.

In an embodiment, operation S510, operation S530-1, operation S550-1, operation S570, operation S710, operation S730, and operation S750 may be performed by an image data generating device (e.g., 150 of FIG. 1), operation S510, operation S530-1, operation 550-1, and operation S570 may be performed by a second image data generator (e.g., 330a of FIG. 7), and operation S710, operation S730, and operation S750 may be performed by a third image data generator (e.g., 350 of FIG. 7).

Figure 9:
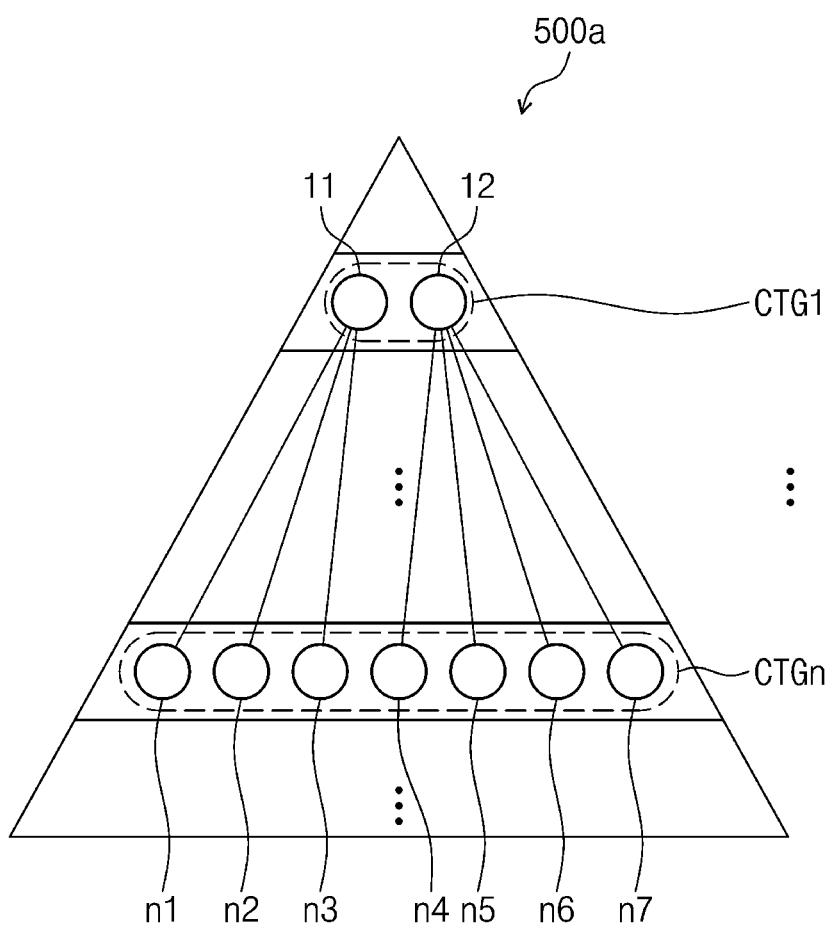
FIG. 9 is a diagram for describing a hierarchical structure including categories into which dangerous objects are classified.

FIG. 9 is a diagram for describing a hierarchical structure including categories into which dangerous objects are classified.

A hierarchical structure 500a is illustrated in FIG. 9. Referring to FIG. 9, the hierarchical structure 500a may be for classifying dangerous objects targeted for detection by an imaging system according to embodiments of the present disclosure depending on a given criterion.

In an embodiment, the hierarchical structure 500a may include two or more categories (e.g., CTG1, . . . , CTGn) (n being an integer of 2 or more). The categories CTG1, . . . , CTGn may be for classifying the dangerous objects depending on different criteria. For example, the category CTG1 may include detailed items 11 and 12, and the category CTGn may include detailed items n1, n2, n3, n4, n5, n6, and n7. A kind and the number of detailed items included in each of the categories CTG1 and CTGn are provided as an example.

In an embodiment, the number of detailed items included in the category CTG1 may be less than the number of detailed items included in the category CTGn. In this case, the category CTG1 may be an "upper category" compared to the category CTGn, and the category CTGn may be a "lower category" compared to the category CTG1. For example, when the category CTG1 includes a sword, a gun, etc. as detailed items, the category CTGn may include a kitchen knife, a cutter knife, a pistol, a live ammunition, etc. as detailed items.

In an embodiment, a given relationship may be formed between the detailed items included in the upper category and the detailed items included in the lower category. For example, as illustrated in FIG. 9, the detailed item 11 may be associated with the detailed items n1 to n3, and the detailed item 12 may be associated with the detailed items n4 to n7. In this case, the detailed item 11 may be a super ordinate concept of the detailed items n1 to n3, and the detailed item 12 may be a super ordinate concept of the detailed items n4 to n7.

Figure 10:
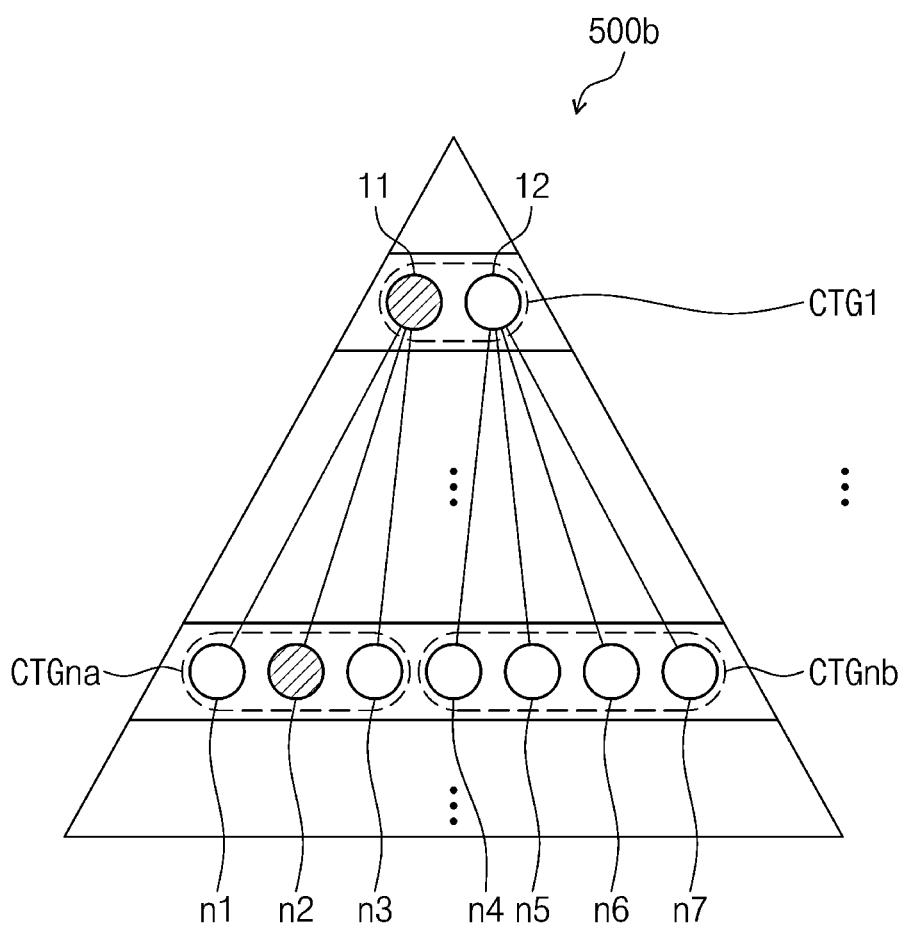
FIG. 10 is a diagram for describing a target object candidate and a final target object of FIG. 5 in a hierarchical structure of FIG. 6.

FIG. 10 is a diagram for describing a target object candidate and a final target object of FIG. 8 in a hierarchical structure of FIG. 9.

A hierarchical structure 500b that is substantially the same as the hierarchical structure 500a of FIG. 9 is illustrated in FIG. 10.

As described with reference to FIG. 1, when the target object candidate (or a boundary of the target object candidate) is detected from first image data (e.g., IMGDAT1 of FIG. 7) based on scan signals, an image data generating device (e.g., 150 of FIG. 1) may generate second image data (e.g., IMGDAT2 of FIG. 7) associated with the sub-region of the first image data; when the final target object (or a boundary of the final target object) is detected from the second image data, the image data generating device may generate third image data (e.g., IMGDAT3 of FIG. 7) as synthetic image data based on the first image data and the second image data.

Referring to FIGS. 9 and 10, the target object candidate may be one of the detailed items 11 and 12 included in the category CTG1 being the upper category. The final target object may be one of the detailed items n1 to n7 included in the category CTGn being the lower category. For example, the image data generating device may detect the target object candidate from the detailed items 11 and 12 included in the upper category and may detect the final target object from the detailed items n1 to n7 included in the lower category.

As described with reference to FIGS. 1 and 7, the image data generating device (e.g., 150 of FIG. 1 or 300a of FIG. 7) may include a second image data generator (e.g., 330a of FIG. 7) and a third image data generator (e.g., 350 of FIG. 7), the second image data generator may include a target object candidate detector (e.g., 331a of FIG. 7), and the third image data generator may include a final target object detector (e.g., 351 of FIG. 7). The target object candidate detector may detect the target object candidate from the first image data by using a third deep learning model (e.g., 370a of FIG. 7), and the final target object detector may detect the final target object from the second image data by using a fourth deep learning model (e.g., 390a of FIG. 7).

In an embodiment, the third deep learning model may be trained to detect the target object candidate from the first image data, and the fourth deep learning model may be trained to detect the final target object from the second image data.

For example, the third deep learning model may be trained to detect the target object candidate from the detailed items 11 and 12 included in the upper category (e.g., CTG1), and the fourth deep learning model may be trained to detect the final target object from the detailed items n1 to n7 included in the lower category (e.g., CTGn).

For example, each of the detailed items 11 and 12 included in the category CTG1 (refer to FIG. 9) may be associated with one or more of the detailed items n1 to n7 included in the category CTGn (refer to FIG. 9). The detailed item 11 may be associated with the detailed items n1 to n3, and the detailed item 12 may be associated with the detailed items n4 to n7. In this case, the detailed items n1 to n3 among the detailed items n1 to n7 included in the lower category may be classified as one (e.g., CTGna) of sub-categories included in the lower category, and the detailed items n4 to n7 among the detailed items n1 to n7 may be classified as another (e.g., CTGnb) of the sub-categories included in the lower category. In this case, the third deep learning model may be trained to detect the target object candidate from the detailed items included in the upper category; when the target object candidate (or a boundary of the target object candidate) is detected, the fourth deep learning model may be trained to detect the target object candidate from detailed items that are included in the lower category and are included in a sub-category associated with the detailed item detected as the target object candidate. For example, when a shaded detailed item (e.g., 11) of the category CTG1 is detected as the target object candidate by using the third deep learning model, a shaded detailed item (e.g., n2) among the detailed items n1 to n3 included in the sub-category (e.g., CTGna) may be detected as the final target object by using the fourth deep learning model.

Figure 11:
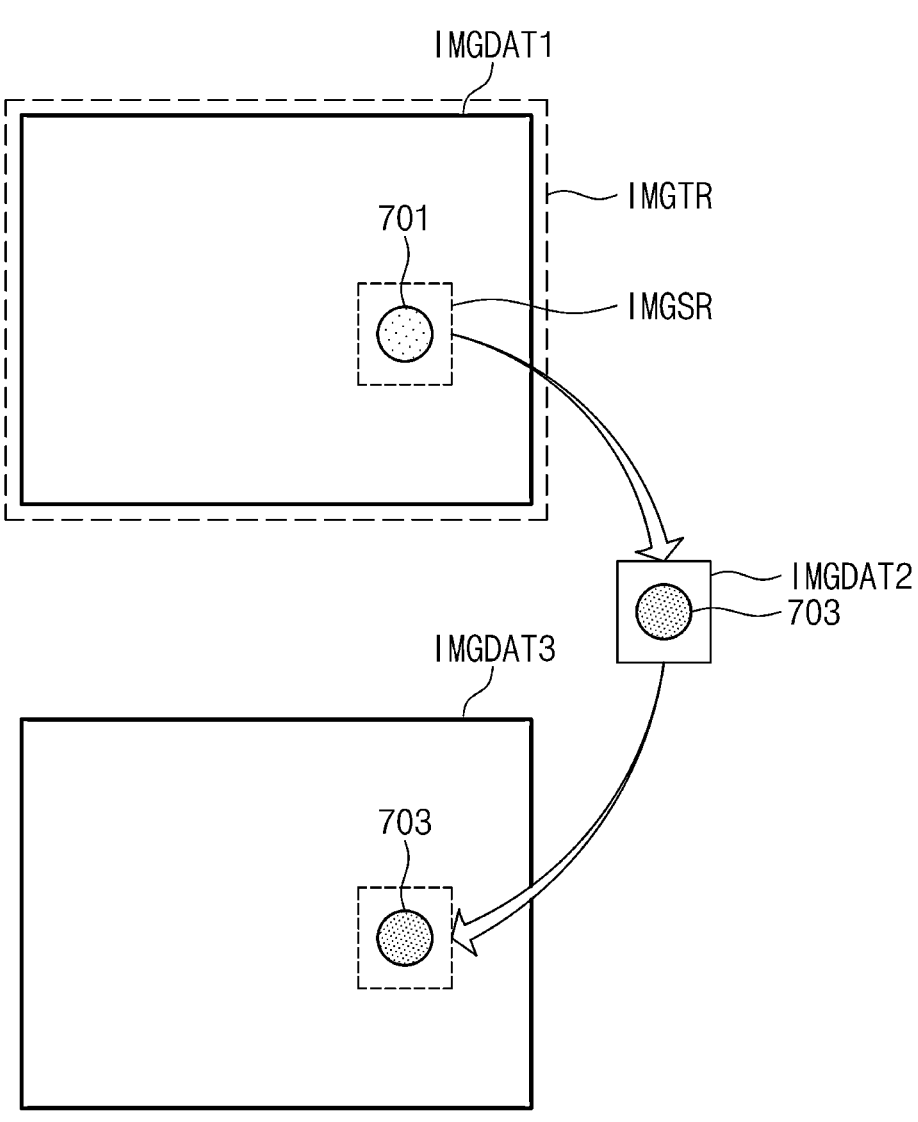
FIG. 11 is a diagram for describing an embodiment of first image data, second image data, and third image data of FIG. 1.

FIG. 11 is a diagram for describing an embodiment of first image data, second image data, and third image data of FIG. 1.

The first image data IMGDAT1, the second image data IMGDAT2, and the third image data IMGDAT3 are illustrated in FIG. 11.

Referring to FIGS. 1 and 11, a transmitter (e.g., 111 of FIG. 1) may emit electromagnetic waves to a scan region; when an object is present in the scan region, a receiver (e.g., 113 of FIG. 1) may receive electromagnetic waves passing through the object (or reflected from the object) and may generate scan signals.

In an embodiment, the first image data IMGDAT1 may be generated with respect to the entire scan region (e.g., IMGTR) where the object is scanned; when the existence of a suspicious object (e.g., 701) (or a boundary of the suspicious object) or a target object candidate (or a boundary of the target object candidate) is detected from the first image data IMGDAT1, the second image data IMGDAT2 may be generated only with respect to a sub-region of the first image data IMGDAT1.

In an embodiment, the sub-region of the first image data IMGDAT1, which is included in the first image data IMGDAT1, may be a local region (e.g., IMGSR) of the first image data IMGDAT1, which includes the suspicious object or the target object candidate.

In an embodiment, when a final target object (e.g., 703) (or a boundary of the final target object) is detected from the second image data IMGDAT2, the third image data IMGDAT3 may be generated by replacing the sub-region of the first image data IMGDAT1 with the second image data IMGDAT2.

In an embodiment, when the existence of the suspicious object (or the boundary of the suspicious object) or the target object candidate (or the boundary of the target object candidate) is not detected from the first image data IMGDAT1 or when the final target object (or the boundary of the final target object) is not detected from the second image data IMGDAT2, the first image data IMGDAT1 may be output as the third image data IMGDAT3 without modification.

FIG. 12 is a diagram for describing techniques for generating first image data and second image data of FIG. 1.

Referring to FIG. 12, an image data generating device (e.g., 150 of FIG. 1) may generate first image data and second image data by using different techniques; in this case, the resolution of the first image data may be different from the resolution of the second image data.

In an embodiment, the first image data may be generated by using a first image data generation technique, and the second image data may be generated by using a second image data generation technique.

For example, the image data generating device may generate the first image data and the second image data based on a first manner illustrated in FIG. 12.

In this case, the first image data may be generated by using a fast Fourier transform technique, and the second image data may be generated by using a high-resolution back-projection technique.

For example, the image data generating device may generate the first image data and the second image data based on a second manner illustrated in FIG. 12. In this case, the, the first image data may be generated by using a low-resolution back-projection technique, and the second image data may be generated by using the high-resolution back-projection technique.

However, the present disclosure is not limited thereto. In an embodiment, the first image data generation technique may include a technique for generating image data at high speed and with a low resolution compared to the second image data generation technique, and the second image data generation technique may include a technique for generating image data at low speed and with a high resolution compared to the first image data generation technique.

Figure 13:
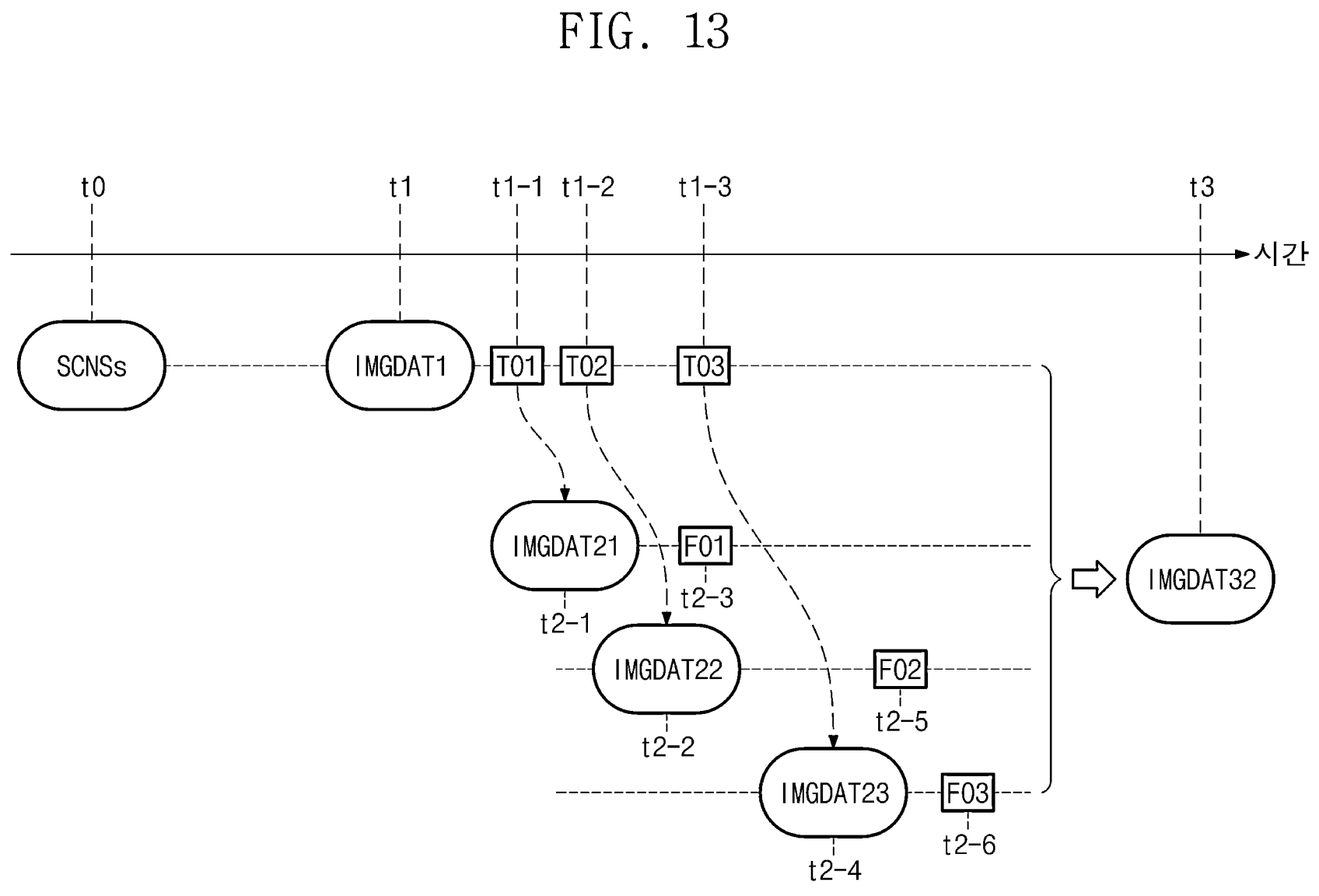

FIG. 13 is a diagram for describing an embodiment of first image data, second image data, and third image data of FIG. 1.

An embodiment in which the first image data IMGDAT1, the second image data IMGDAT2, and the third image data IMGDAT3 are generated based on the scan signals SCNSs over time is illustrated in FIG. 13.

Referring to FIG. 13, an electromagnetic wave transceiver (e.g., 110 of FIG. 1) may generate the scan signals SCNSs. An image data generating device (e.g., 150 of FIG. 1) may generate the first image data IMGDAT1 based on the scan signals SCNSs.

The image data generating device may detect the existences of one or more suspicious objects or target object candidates (e.g., T01, T02, and T03) from the first image data IMGDAT1 and may generate one or more second image data (e.g., IMGDAT21, IMGDAT22, and IMGDAT23); the image data generating device may detect one or more final target objects (e.g., F01, F02, and F03) from the one or more second image data and may generate the third image data IMGDAT3.

For example, the scan signals SCNSs may be generated at a point in time t0, and the first image data IMGDAT1 may be generated at a point in time t1.

The existences of the suspicious objects or the target object candidates T01, T02, and T03 may be detected from the first image data IMGDAT1 at points in time t1-1, t1-2, and t1-3, respectively; the second image data IMGDAT21, IMGDAT22, and IMGDAT23 respectively corresponding to the existences of the suspicious objects or the target object candidates T01, T02, and T03 may be generated at points in time t2-1, t2-2, and t2-4, respectively; the final target objects F01, F02, and F03 respectively corresponding to the second image data IMGDAT21, IMGDAT22, and IMGDAT23 may be detected at points in time t2-3, t2-5, and t2-6, respectively.

An embodiment in which the target object candidates T01, T02, and T03 are detected from the first image data IMGDAT1, the second image data IMGDAT21, IMGDAT22, and IMGDAT23 respectively including the target object candidates T01, T02, and T03 and associated with sub-regions of the first image data IMGDAT1 are generated, and the third image data IMGDAT3 are generated at a point in time t3 is illustrated in FIG. 13, but the present disclosure is not limited thereto. As described with reference to FIG. 1, each of the second image data IMGDAT21, IMGDAT22, and IMGDAT23 may be generated when the corresponding target object candidate is detected from the first image data IMGDAT1, and the existences of suspicious objects (or boundaries of the suspicious objects) or a final target object (or a boundary of the final target object) may be detected from each of the second image data IMGDAT21, IMGDAT22, and IMGDAT23. For example, unlike the example illustrated in FIG. 13, when only some of the existences of suspicious objects (or the boundaries of the suspicious objects) or target object candidates T01, T02, and T03 (or boundaries of the final target objects) are detected from the first image data IMGDAT1 or when only some of the final target objects F01, F02, and F03 (or boundaries of the final target objects) are detected from the second image data IMGDAT21, IMGDAT22, and IMGDAT23, the third image data IMGDAT3 may be generated faster than the point in time t3.

As described with reference to FIG. 1, an image data generating device (e.g., 150 of FIG. 1) may generate the first image data IMGDAT1 and the second image data IMGDAT21, IMGDAT22, and IMGDAT23 by using different techniques; in this case, the resolution of the first image data IMGDAT1 may be different from the resolution of the second image data IMGDAT21, IMGDAT22, and IMG-DAT23. As described with reference to FIG. 12, the first image data IMGDAT1 may be generated by using one or all of the fast Fourier transform technique and the low-resolution back-projection technique, and each of the second image data IMGDAT21, IMGDAT22, and IMGDAT23 may be generated by using the high-resolution back-projection technique. As illustrated in FIG. 13, first image data (e.g., IMGDAT1) may be generated during a first time period (e.g., from t0 to t1), second image data (e.g., IMGDAT21) may be generated during a second time period (e.g., from t1-1 to t1-2), and the second time period may be shorter than the first time period.

Figure 14:
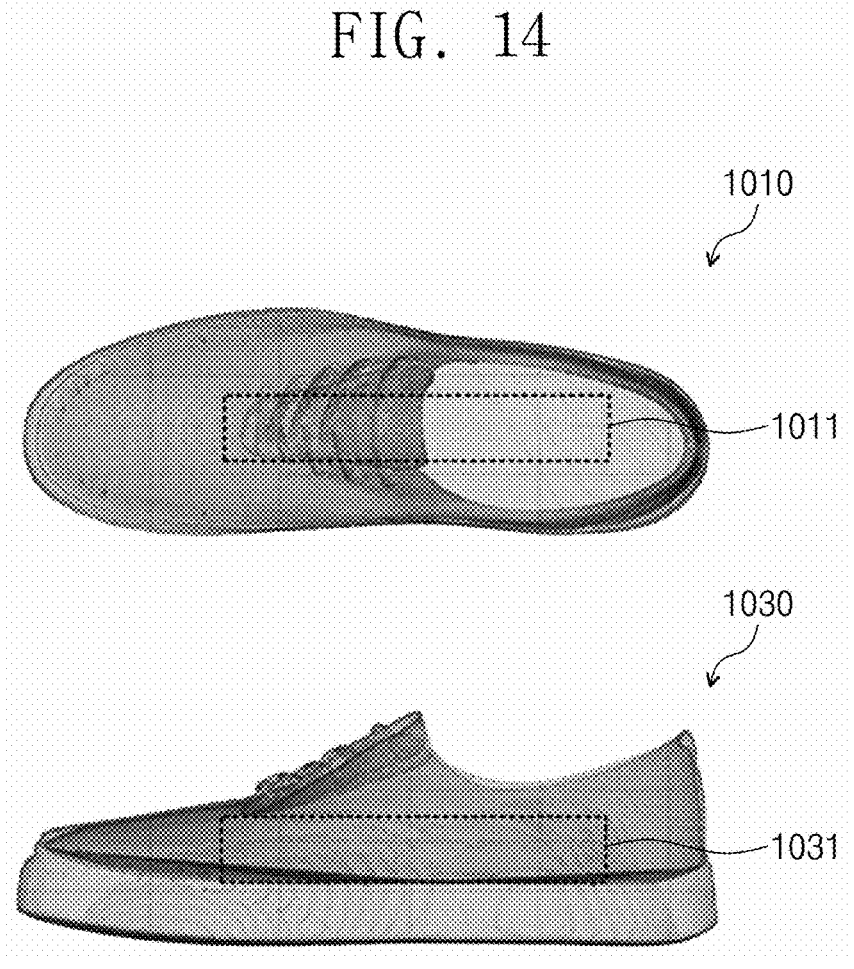
FIG. 14 is a diagram for describing an embodiment of an object of FIG. 1.

FIG. 14 is a diagram for describing an embodiment of an object of FIG. 1.

A plan view 1010 and a side view 1030 associated with an embodiment of the object 200 of FIG. 1 are illustrated in FIG. 14. A dangerous object (e.g., a knife) may be hidden in the object 200; referring to FIG. 14, the dangerous object is illustrated as a dangerous object 1011 in the plan view 1010, and the dangerous object is illustrated as a dangerous object 1031 in the side view 1030.

Figure 15:
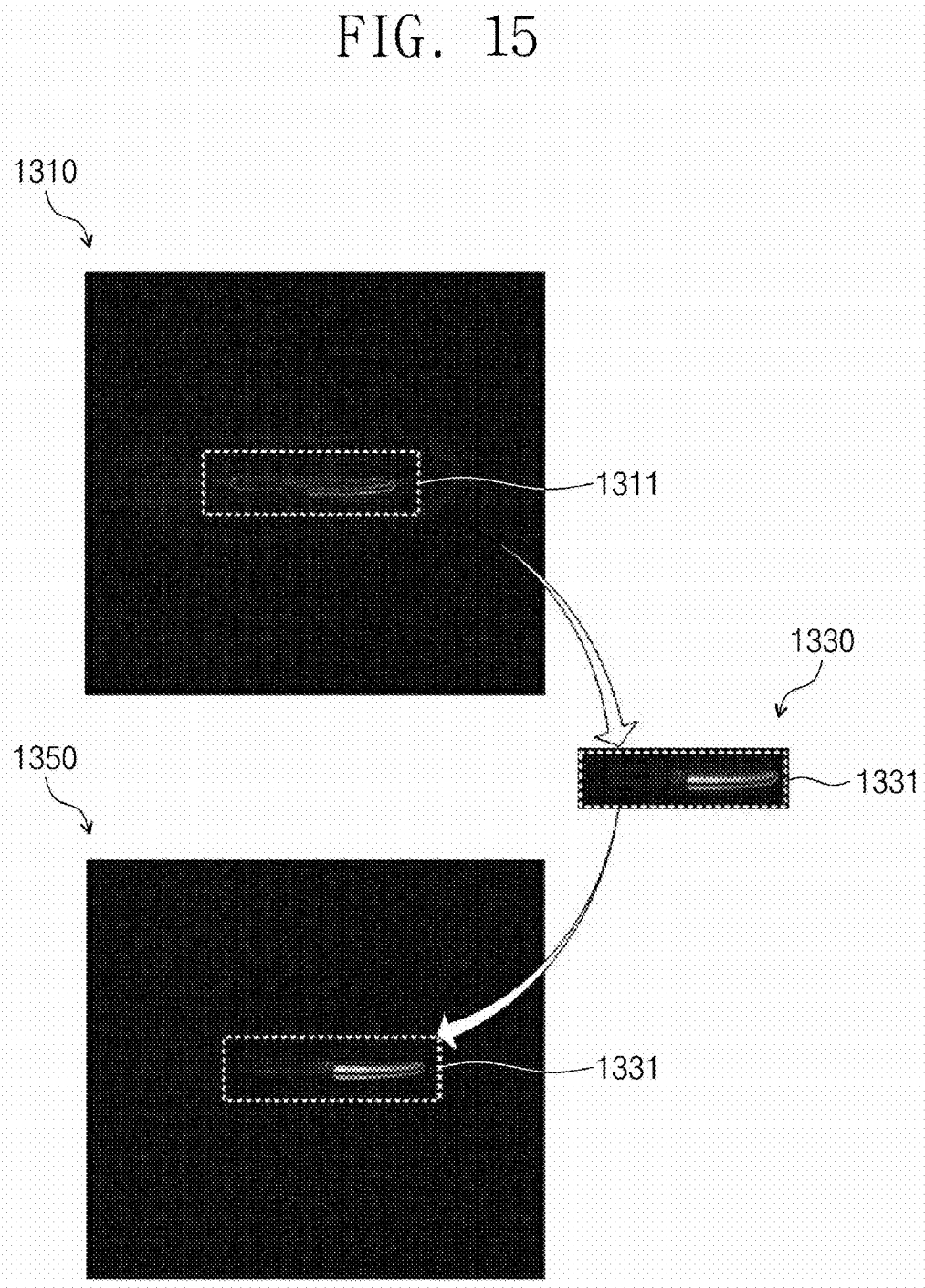
FIG. 15 is a diagram illustrating an embodiment of first image data, second image data, and third image data associated with an object of FIG. 1.

FIG. 15 is a diagram illustrating an embodiment of first image data, second image data, and third image data associated with an object of FIG. 2.

Image data 1310, 1330, and 1350 are illustrated in FIG. 15, and the image data 1310, 1330, and 1350 may respectively correspond to the first image data IMGDAT1, the second image data IMGDAT2, and the third image data IMGDAT3 illustrated in FIG. 11.

In an embodiment, the first image data 1310 may be generated by an electromagnetic wave transceiver (e.g., 110 of FIG. 1) based on scan signals obtained by emitting a terahertz wave to an object (e.g., an object illustrated in the plan view 1010 and the side view 1030 of FIG. 14). An image data generating device (e.g., 150 of FIG. 1) may detect the existence of a suspicious object (or a boundary of the suspicious object) or a target object candidate (e.g., 1311) from the first image data 1310 by using a first deep learning model; when the existence of the suspicious object (or the boundary of the suspicious object) or the target object candidate (or boundary of target object candidate) is detected, the image data generating device may generate the second image data 1330. The image data generating device may detect a final target object (e.g., 1331) from the second image data 1330 by using a second deep learning model or a fourth deep learning model; when the final target object (or a boundary of the final target object) is detected, the image data generating device may generate the third image data 1350 including the second image data 1330.

As described above, an imaging system according to embodiments of the present disclosure may efficiently search for and detect a hidden dangerous object by using electromagnetic waves. The imaging system may generate image data with a low resolution and may additionally generate image data with a high resolution only when given conditions are satisfied, and thus, the imaging system may search for and detect a dangerous object at high speed and with high precision. The imaging system may be implemented in a multi-static manner and may provide performance of an equivalent level by using a small number of signal sources and a small number of detectors, compared to a mono-static manner where a transmitter and a receiver are disposed at the same location or at neighboring locations. The imaging system may search for and detect a dangerous object in real time without harmfulness to the human body by using terahertz waves, and thus, the imaging system may be used in a security system of a walk-through manner.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image data generating method comprising:
performing operations of emitting electromagnetic waves to an object and receiving scan signals scanning the object, by using an electromagnetic wave transceiver;
generating first image data of a low resolution based on the scan signals;
generating second image data of a high resolution associated with a sub-region of the first image data when at least one of a suspicious object and a target object candidate is detected in the sub-region; and
detecting, from the second image data, a final target object different from both the suspicious object and the target object candidate.

2. The image data generating method of claim 1, wherein the first image data are generated by using one or all of a fast Fourier transform technique and a low-resolution back-projection technique, and wherein the second image data are generated by using a high-resolution back-projection technique.

3. The image data generating method of claim 2, further comprises:
generating third image data based on the first image data and the second image data when the final target object is detected.

4. The image data generating method of claim 3, wherein the generating of the second image data includes:
determining whether the target object candidate is detected from the first image data, by using a first deep learning model, and
wherein the generating of the third image data includes:
determining whether the final target object is detected from the second image data, by using a second deep learning model.

5. The image data generating method of claim 4, wherein dangerous objects are classified based on a hierarchical structure so as to be included in an upper category and a lower category, wherein the target object candidate is one of first detailed items included in the upper category, and wherein the final target object is one of second detailed items included in the lower category.

6. The image data generating method of claim 5, wherein the first deep learning model detects one of the first detailed items as the target object candidate, and wherein the second deep learning model detects one of the second detailed items as the final target object.

7. The image data generating method of claim 3, wherein the generating of the third image data includes:
composing the first image data and the second image data.

8. The image data generating method of claim 7, wherein the first image data are generated with respect to an entire scan region where the object is scanned, and wherein the second image data are generated only with respect to the sub-region of the first image data.

9. The image data generating method of claim 8, wherein the third image data are generated by replacing the sub-region of the first image data with the second image data.

10. The image data generating method of claim 1, wherein the generating of the first image data includes:

generating preprocessed data by performing noise cancellation, error correction, or data alignment with respect to the scan signals; and generating the first image data by processing the preprocessed data by using one or all of a fast Fourier transform technique and a low-resolution back-projection technique.

11. The image data generating method of claim 1, wherein the electromagnetic wave transceiver includes:

a transmitter configured to emit the terahertz wave to a scan region; and a receiver configured to receive the scan signals when the object is present in the scan region.

12. The image data generating method of claim 3, wherein each of the first image data, the second image data, and the third image data is three-dimensional (3D) image data.

13. An imaging system comprising:

an electromagnetic wave transceiver configured to emit electromagnetic waves to an object and to receive scan signals scanning the object; and an image data generating device configured to generate synthetic image data based on the scan signals, wherein the image data generating device is configured to:

generate first image data of a low resolution based on the scan signals;

generate second image data of a high resolution associated with a sub-region of the first image data when at least one of a suspicious object and a target object candidate is detected in the sub-region; and detect a final target object different from both the suspicious object and the target object candidate.

14. The imaging system of claim 13, wherein the image data generating device includes:

a first image data generator configured to generate the first image data by applying one or all of a fast Fourier transform technique and a low-resolution back-projection technique to the scan signals;

a second image data generator configured to detect a target object candidate from the first image data and to generate the second image data by applying a high-resolution back-projection technique to the sub-region of the first image data; and a third image data generator configured to detect a final target object from the second image data and to generate a third image data based on the first image data and the second image data.

15. The imaging system of claim 14, wherein the image data generating device further includes:

a first deep learning model configured to detect the target object candidate; and a second deep learning model configured to detect the final target object.

16. The imaging system of claim 15, wherein dangerous objects are classified based on a hierarchical structure so as to be included in an upper category and a lower category, wherein the target object candidate is one of first detailed items included in the upper category, and wherein the final target object is one of second detailed items included in the lower category.

17. The imaging system of claim 14, wherein the third image data generator is configured to generate the third image data by replacing the sub-region of the first image data with the second image data.

18. The imaging system of claim 13, wherein the electromagnetic wave transceiver includes:

a transmitter configured to emit terahertz waves to a scan region; and a receiver spaced apart from the transmitter and configured to receive the scan signals when the object is present in the scan region.

* * * * *